US011345499B2

(12) United States Patent
Canalicchio et al.

(10) Patent No.: US 11,345,499 B2
(45) Date of Patent: May 31, 2022

(54) PACKAGING APPARATUS, REMOVAL APPARATUS AND METHOD FOR WITHDRAWING A CARDBOARD BLANK

(71) Applicant: Krones Aktiengesellschaft, Neutraubling (DE)

(72) Inventors: Christian Canalicchio, Bad Endorf (DE); Rudolf Schrems, Raubling (DE); Wolfgang Fechter, Rosenheim (DE)

(73) Assignee: KRONES Aktiengesellschaft, Neutraubling (DE)

( * ) Notice: Subject to any disclaimer, the term of this patent is extended or adjusted under 35 U.S.C. 154(b) by 264 days.

(21) Appl. No.: 16/705,502

(22) Filed: Dec. 6, 2019

(65) Prior Publication Data

US 2020/0189779 A1  Jun. 18, 2020

(51) Int. Cl.
 *B65B 43/18* (2006.01)
 *B31B 50/80* (2017.01)
 (Continued)

(52) U.S. Cl.
 CPC ............ *B65B 43/185* (2013.01); *B31B 50/80* (2017.08); *B65B 43/265* (2013.01); *B65G 47/91* (2013.01);
 (Continued)

(58) Field of Classification Search
 CPC ..... B65B 43/185; B65B 43/265; B31B 50/80; B31B 2120/30; B65G 47/91; B65G 59/045
 See application file for complete search history.

(56) References Cited

U.S. PATENT DOCUMENTS

| | | | |
|---|---|---|---|
| 5,024,640 A | 6/1991 | Saitoh | |
| 5,921,375 A * | 7/1999 | van Laar | B65G 47/914<br>198/471.1 |

(Continued)

FOREIGN PATENT DOCUMENTS

| | | |
|---|---|---|
| CN | 104608960 A | 5/2015 |
| JP | 2002255117 A | 9/2002 |
| JP | 3858610 B2 | 12/2006 |

OTHER PUBLICATIONS

Priority Application: 10 2018 132 330.1 Filed Dec. 14, 2018—German Search Report dated Aug. 1, 2019.

(Continued)

*Primary Examiner* — Chelsea E Stinson
*Assistant Examiner* — Scott A Howell
(74) *Attorney, Agent, or Firm* — Simmons Perrine Moyer Bergman PLC (57) ABSTRACT

The invention relates to a packaging apparatus (1) for combining a plurality of articles (8) an outer package (6) formed from a cardboard blank (3). The packaging apparatus (1) comprises a magazine (2) for cardboard blanks (3), the cardboard blanks (3) being stacked and lying on top of one another within the magazine (2), a removal apparatus (4) for the cardboard blanks (3), and a handling device (5). The removal apparatus (4) is vertically and horizontally movable and comprises at least one suction tool (9) for withdrawing a cardboard blank (3) from the magazine (2). The suction tool (9) arranged pivotally movable within the removal apparatus (4) or on the removal apparatus (4) for executing a compensation movement and aligning the withdrawn cardboard blank (3) in a horizontal plane. The invention also concerns the removal apparatus (4) (3) and a method for withdrawing cardboard blanks (3).

15 Claims, 5 Drawing Sheets

(51) Int. Cl.
    *B65B 43/26*     (2006.01)
    *B65G 47/91*     (2006.01)
    *B65G 59/04*     (2006.01)
    *B31B 120/30*     (2017.01)

(52) U.S. Cl.
    CPC ........ *B65G 59/045* (2013.01); *B31B 2120/30* (2017.08)

(56) References Cited

U.S. PATENT DOCUMENTS

| | | | |
|---|---|---|---|
| 6,915,622 B2 | 7/2005 | Spatafora | |
| 7,611,180 B1 * | 11/2009 | Fisher | B25J 15/0052 294/65 |
| 9,221,623 B2 * | 12/2015 | Heitplatz | B65G 47/91 |
| 10,167,099 B2 | 1/2019 | Hutter et al. | |
| 10,703,063 B2 * | 7/2020 | Heath | B31B 50/804 |
| 10,906,170 B2 * | 2/2021 | Zaffaroni | B25J 17/0241 |
| 10,933,537 B1 * | 3/2021 | Polido | B25J 13/081 |
| 11,077,564 B1 * | 8/2021 | Polido | B25J 15/0052 |
| 11,084,175 B2 * | 8/2021 | Polido | B25J 15/0061 |
| 2014/0179501 A1 * | 6/2014 | Akama | B25J 9/0096 493/162 |
| 2018/0043650 A1 * | 2/2018 | Heath | B31B 50/784 |
| 2019/0160691 A1 * | 5/2019 | O'Connor | B25J 15/0666 |
| 2019/0161223 A1 | 5/2019 | Brizzi | |
| 2020/0122317 A1 * | 4/2020 | Zaffaroni | F16B 5/0621 |

OTHER PUBLICATIONS

European Patent Application—Extended European Search Report dated May 19, 2020.

* cited by examiner

PACKAGING APPARATUS, REMOVAL APPARATUS AND METHOD FOR WITHDRAWING A CARDBOARD BLANK

CLAIM OF PRIORITY

The present application claims priority to German Application 10 2018 132 330.1, filed Dec. 14, 2018, which is incorporated by reference.

FIELD OF THE INVENTION

The present invention concerns a packaging apparatus, a removal apparatus and a method for withdrawing a cardboard blank.

BACKGROUND OF THE INVENTION

The handling of articles, for example beverage containers such as bottles or cans, often includes a step where individual or multiple articles are provided with outer packaging. In the case of individual articles, this is done for their improved protection and/or for their improved sales presentation. In the case of several articles, the outer packaging combines these several articles to a package or bundle.

Such packages are an effective way to enable the simultaneous handling of several articles, for example, to facilitate the transport of several articles at the same time. Packages holding together several articles are therefore the most common variant of sales units for many articles, such as beverage containers.

The articles may, for example, be objects such as packaged or unpackaged objects, containers, such as beverage bottles or cans, or even packages made up of several objects, whereby the objects of a package can be held together, for example, by an enclosure surrounding a group of objects on their periphery, such as a strapping, an outer packaging, such as a wrapping, a shrink tube or a cardboard box or a carrying rack, such as a beverage crate, to name only a few conceivable variations.

Cardboard boxes may be used as outer packaging containing one or more articles. These cardboard boxes provide a high level of additional protection for the articles contained therein. Furthermore, the cardboard boxes with the articles contained therein are stackable and also enable the identification of the articles contains therein by information printed in the outside of the cardboard boxes or affixed to the outside of the cardboard boxes, especially information tags glued to the outside of the cardboard box. The cardboard boxes can also be used as advertising media by providing appropriate information on their outside.

Cardboard boxes are industrially prefabricated containers which are folded or collapsed to a particularly small spatial dimension or packing size. Usually cardboard boxes have the form of cuboid containers and are transported and stored in a space-saving manner in a collapsed state until they are used. In order to use the cardboard boxes, they are expanded, when required, into outer packages with simple manual manipulation steps or by a respective machine, as is known, for example, from expanding cartons used for postal parcels. In their folded or collapsed state, the cardboard boxes require little space for transport and storage.

Outer packages may be, for example, containers made up of cardboard boxes with or without partitions arranged within the outer packages or arrangeable within the outer packages, whereby individual articles are separated by the partitions, which partitions may also be known as basket.

For example, outer packages with partitions already arranged within are known. These can be designed as cardboard boxes with interior fittings arranged inside, which interior fittings can also be transported and stored in a folded or collapsed manner and, if required, unfolded or expanded with simple manual manipulation steps or by a respective machine.

The term "partitions" and/or the term "outer packages" is used in place of the described outer packaging, which are designed as cardboard boxes and can be folded or unfolded as required with easy manual manipulation steps or by a respective machine, as well as for collapsible and unfoldable partitions, and also for those already having partitions or so-called baskets already arranged within the cardboard boxes. Especially when the term "partitions" and/or the term "outer packages" is used in the following description it comprises the three different embodiments, unless something else is mentioned explicitly.

Partitions and/or outer packages are preferably made of one-piece or multi-piece cardboard boxes that are made of stabilized types of paper, such as cardboard and/or paperboard. Cardboard boxes in various thicknesses and sizes are known for every type of partitions and/or outer packages. Corrugated cardboard can be used, for example, to protect sensitive articles.

Carton which can be unfolded or pulled up into partitions and/or outer packages have carton walls which are interconnected by folding edges and/or adhesive connections and/or plug-in connections and which can, for example, be cut out and/or punched out of a sheet material. In the collapsed state, before the carton is unfolded, at least two interconnected carton walls form an upper flat side and a lower flat side of the flat collapsed carton.

For some applications, the collapsed cartons are provided standing in an upright position within a magazine. The cardboard boxes are removed sideways and pulled into the appropriate form using suitable tools. However, the space requirement of such a magazine in the horizontal direction is considerable. A device in which the cartons are provided standing in an upright position within a magazine and the withdrawal of the cartons from the magazine is shown, for example, in document JP 3858610 B2.

When dealing with articles, the space required for the construction of the respective industrial plant technology is a not insignificant cost factor. The floor space required for the packaging apparatus presents a high cost factor, since most systems do not exhaust the available room heights that are usually available in the production halls. A contribution to achieving the smallest possible footprint with a low horizontal space requirement can be obtained by stacking the cartons vertically.

In this case, the folded or collapsed cardboard boxes must be withdrawn from the magazine in an upward movement with a suitable tool and delivered to subsequent handling devices for further processing. For example, EP 3 012 201 B1 describes a gripping device with at least one tool, which is preferably directed downwards, with which tool an uppermost folded cardboard box lying on top of a stack of folded cardboard boxes can be gripped and held on a cardboard box wall of its upper flat side. Preferably, four interacting vacuum cups are provided, which jointly suck at the uppermost folded cardboard box, which is to be withdrawn, and thus grasp it. The four vacuum cups of the gripping device, which hold the folded cardboard box, can be moved together and in particular synchronously horizontally and vertically in space in order to feed the seized folded cardboard box to subsequent handling devices for further processing, for example to an unfolding device in which the folded cardboard box is brought into the respective form that is suitable for filling the unfolded cardboard box with articles.

The problem here is, that in some cases the folded cardboard boxes or the folded cardboard blanks can have a greater height on one side. This leads to an inclined position of the folded cardboard blanks stacked within the magazine, which inclined position gets more pronounced the more cardboard blanks are arranged one above the other within the magazine. This can lead to problems when withdrawing the cardboard blanks from the magazine, since it cannot be picked up equally well by all vacuum cups, for example. This may lead to the uppermost cardboard blank not being withdrawn from the magazine at all or being lost during transfer to further processing devices. Position shifts, for example caused by the cardboard blanks slipping off the vacuum cups, are also problematic for further processing. These problems lead to problems in the subsequent production process, especially due to the formation of defective products or even to production stops due to cardboard blanks or the like blocking further processing.

The task of the invention is to provide a removal apparatus for cardboard blanks, including partitions, outer packages, baskets, etc., the cardboard blanks or the like lying on top of each other, with which removal apparatus even cardboard blanks in an inclined position relative to a horizontal plane can be reliably seized, withdrawn and supplied to subsequent processing devices.

SUMMARY OF THE INVENTION

The invention relates to a packaging apparatus, in particular for combining a plurality of articles by an outer package formed from a cardboard blank.

In the present context, the term "outer package" refers in particular to an outer package to be produced from a cardboard blank, whereby the cardboard blank is essentially flatly folded and made available in a magazine. The form and design of the cardboard blank is prepared in such a way that it can be converted into a form prepared for filling with articles by unfolding or pulling it up. For example, dividing elements are already formed and/or arranged within the cardboard blank, which dividing elements form finished partitions when the cardboard blank is unfolded or pulled up. Furthermore, adhesions may be provided, so that the outer package essentially takes on a finished form after unfolding or pulling up and can be filled directly with articles. Subsequently, it may be necessary to close the outer package. The finished outer package can, for example, be so-called trays, on which trays the articles are arranged before they are combined with another outer package in the form of a shrink film or similar to form a finished package. Alternatively, a cardboard outer package can also be formed from a suitable cardboard blank after unfolding or pulling up the respective cardboard blank. These cardboard blanks can, for example, comprise internal dividing elements or partitions in order to separate the articles from each other within the carton outer package and thus better protect the articles within the carton outer package. Particularly preferred are cardboard blanks, which after unfolding or pulling up form so-called baskets. Baskets are in particular carrying devices with a plurality of individual compartments, in each of which compartment an article can be arranged, and which baskets preferably have a suitable carrying handle, which is, in particular, arranged centrally.

In the following, the term "article" is preferably used for beverage containers, in particular bottles made of glass or plastic, cans or similar. The beverage containers can either be filled with an appropriate beverage and sealed. Alternatively, the outer package to be formed is also suitable for transporting empty containers.

The packaging apparatus comprises a magazine for cardboard blanks, the cardboard blanks being arranged lying on top of each other within the magazine. The advantage of this method for providing the cardboard blanks stacked on top of each other is, particularly, the small space requirement. The so-called footprint of the magazine, especially the space required by the magazine, is essentially determined by the base area of a folded cardboard blank. The capacity of such a magazine for cardboard blanks is limited in particular by the height of the side walls or shaft walls confining the magazine.

The packaging apparatus further comprises at least one removal apparatus for withdrawing cardboard blanks from the magazine and transferring the respectively withdrawn cardboard blank to a handling device which serves for further processing of the cardboard blank. For example, the subsequent handling device can be a pulling up device or unfolding device, in which device the cardboard blanks are brought into a form suitable for filling with articles.

It is provided that the entire removal apparatus is vertically movable and horizontally movable in order to be able to carry out the transfer of a cardboard blank to the subsequent handling device, which cardboard blank is withdrawn by the at least one suction tool.

The removal apparatus comprises at least one suction tool for seizing a cardboard blank from the magazine. Here it is provided that the suction tool is arranged pivotably in at least one further axis within the removal apparatus or on the removal apparatus. Because of this additional swivel option, the suction tool can perform a compensating movement and is therefore able to bring the seized cardboard blank into a horizontal orientation or into alignment with a horizontal plane, which horizontal orientation is desired and/or necessary for the subsequent processing.

In accordance with a preferred embodiment, the suction tool of the removal apparatus is vertically movable, in particular it can be provided that the suction tool is arranged vertically movable within the removal apparatus or that the suction tool is arranged vertically movable on the removal apparatus. In particular, this embodiment allows the suction tool to be moved vertically, i.e. up or down, relative to other components of the removal apparatus.

In particular, the uppermost cardboard blank is sucked in and thereby seized by the at least one suction tool and gets separated from the underlying cardboard blanks by an upward vertical movement of the suction tool and/or by an upward vertical movement of the entire removal apparatus. The cardboard blank is thereby removed from the magazine and fed to a subsequent handling device for further processing.

In particular, the length of the required vertical movement depends on the respective filling state of the magazine with cardboard blanks. When the magazine is completely filled with cardboard blanks, the removal apparatus only needs to make a minor downward movement to pick up the uppermost cardboard blank and accordingly a corresponding minor upward vertical lift is required to withdraw the cardboard blank with an upwards directed movement over the side walls confining the magazine and to subsequently feed the seized and withdrawn cardboard blank to further processing by a lateral movement.

According to one embodiment of the invention, at least one suction tool is designed as a vacuum suction cup. By applying a vacuum, the cardboard blank is sucked in and can then be released again by increasing the pressure inside the vacuum cup.

The invention also refers to a removal apparatus, which has been already described above in connection with the packaging apparatus or which will be described in more detail below in connection with the packaging apparatus. All the characteristics of the removal apparatus described in connection with the packaging apparatus also refer to such an apparatus alone. All characteristics described in connection with the removal apparatus also refer to packaging apparatuses which include a respective removal apparatus.

In addition, a method according to the invention for withdrawing a cardboard blank from a magazine is described, which cardboard blank is used for producing an outer package for combining a plurality of articles, wherein the cardboard blanks are arranged in a stacked manner lying one above the other within a magazine and wherein the cardboard blanks can have an inclined position within the magazine, whereby during the withdrawal of the cardboard blank from the magazine each seized cardboard blank is aligned within the magazine in a horizontal plane.

It should be explicitly mentioned at this point that all aspects and embodiments explained in connection with the packaging apparatus or removal apparatus according to the invention equally concern or may concern partial aspects of the method according to the invention. Therefore, if certain aspects and/or relationships and/or effects are mentioned at one point in the description or also in the claim definitions of the packaging apparatus or removal apparatus according to the invention, this equally applies to the method according to the invention. Conversely the same applies, so that all aspects and embodiments which have been explained in connection with the method according to the invention also concern or may concern partial aspects of the packaging apparatus or removal apparatus according to the invention.

In accordance with a preferred embodiment, it is intended that an orientation of the suction tool is automatically set when the uppermost cardboard blank is seized, wherein the orientation of the suction tool is set according to the orientation of the upper side of the uppermost cardboard blank relative to the horizontal plane. The orientation of the suction tool is adjusted as described above by the swivelling or pivoting of the suction tool in at least one further axis, in particular the swivelling or pivoting in an axis which does not coincide with the horizontal axis and the vertical axis in which the removal apparatus is designed to be movable. In the present context the term "vertical axis" is used to describe in particular an axis perpendicular to the center of the earth.

In particular, the suction tool has an underside designed as a suction surface. The removal apparatus is lowered onto the uppermost cardboard blank from above until the suction tool is positioned directly above the uppermost cardboard blank or comes to rest on the upper surface of the uppermost cardboard blank. Additionally, it may be provided, that the suction tool may also be lowered further relative to the removal apparatus. When the suction tool is placed on the upper side of the uppermost cardboard blank, the suction tool is moved in such a way that the complete suction surface is in contact with the cardboard blank. This movement may be necessary due to an inclined position of the cardboard blank. For this purpose, it may be necessary to swivel or pivot the suction tool in such a way that the suction surface has an inclined orientation with respect to a horizontal plane, the inclined orientation of the suction cup corresponding to an inclined position of the cardboard blank to be withdrawn. The suction tool or removal apparatus is then moved vertically upwards in order to separate the uppermost cardboard blank from the underlying cardboard blanks and to remove the seized uppermost cardboard blank from the magazine.

Thereby, the suction tool orientates itself again so that the suction surface is now arranged and/or aligned within a horizontal plane. Because of this horizontal orientation of the suction tool, the cardboard blank seized by the suction tool is also orientated, so that the cardboard blank is now also aligned within a horizontal plane. The alignment and/or orientation of the suction tool and the corresponding alignment and/or orientation of the seized cardboard blank is preferably carried out within the lateral boundaries of the side walls or shaft walls of the magazine. The magazine walls prevent, in particular, the seized cardboard blank to laterally swivel out.

For example, sensors can be provided to detect the exact positioning of the suction tool on the oriented cardboard blank. The data thus determined is used in particular to check the release of the cardboard blank within a subsequent handling device, in particular the data is used to be able to position the cardboard blank precisely within the subsequent handling device so that the cardboard blank can be further directly processed.

In accordance with a preferred embodiment, at least one pneumatic unit is assigned to a suction tool, for example, a pneumatic cylinder unit is assigned to a suction tool. In particular, the at least one suction tool is arranged at a lower end of an essentially vertically aligned pneumatic unit. Preferably, the pneumatic unit is designed as part of the removal apparatus. The suction tool can be arranged on the pneumatic unit in an oscillating manner or a pendular manner. An alternative embodiment provides for the pneumatic unit to be suspended in a pendular manner within the removal apparatus. The pendular suspension further increases the degree of freedom of movement of the suction tool and further optimizes the possibilities of withdrawing the uppermost cardboard blank, even when the uppermost cardboard blank is in an inclined orientation.

It may also be provided that the removal apparatus comprises at least one stop element that is assigned to the suction tool. Preferably, the stop element provides at least one stop surface for a cardboard blank that is seized by the suction tool, the stop surface being located within a horizontal plane. The stop surface serves as an additional support for adjusting the horizontal orientation of the seized cardboard blank. For example, it can be provided that for the withdrawal of the cardboard blank, the suction tool is moved downwards relative to the other components of the removal apparatus by the pneumatic unit, in particular that the suction tool is moved relative to the stop element. The suction tool is then pulled upwards again by the pneumatic unit until the upper side of the cardboard blank seized by the suction tool rests on the stop surface of the stop element. For example, a contact switch can be provided, which is triggered when the cardboard blank is completely in contact with the stop element and which contact switch stops the further upward movement of the suction tool by the pneumatic unit.

For the safe transport of the seized cardboard blank, at least one further fixing device for the cardboard blank may be provided on the stop element, in particular a plurality of further vacuum cups or similar may be arranged on the underside of the stop element.

In accordance with an embodiment of the invention, the stop element is designed as a horizontally aligned stop plate and has a largely central passage opening. The suction tool is arranged within the passage opening and can be guided downwards and upwards through the passage opening by a vertical movement. When seizing the cardboard blank from the stack within the magazine, in particular, the lower suction surface of the suction tool is arranged well below the stop plate. After aligning the cardboard blank with the stop plate, the lower suction surface is arranged in essentially the same horizontal plane as the stop surface of the stop plate.

According to an embodiment, the suction tool is designed laterally movable within the passage opening. This is due in particular to the already described pendular suspension of the pneumatic unit within the removal apparatus or the pendular suspension of the suction tool on the pneumatic unit. Thereby, the pendular movement is limited by the size of the passage opening.

Preferably, it is intended, that the suction tool directly occupies a central position when seizing the uppermost cardboard blank. In particular, no pendular movement is possible at this time, for example, the pendular movement is blocked to enable precise central positioning of the suction tool on the cardboard blank. As soon as the suction tool seizes the cardboard blank and begins to detach it from the underlying cardboard blanks of the stack by an upward movement, the blockade or the like is released, so that the suction tool can now perform a lateral pendular movement and so that the cardboard blank can align itself horizontally within the lateral boundaries of the magazine.

To protect the suction tool and/or the pneumatic unit during the pendular movement, it may be provided that the suction tool and/or the pneumatic unit are at least partially surrounded by a protective housing. This protective housing can preferably be a funnel-shaped housing, which tapers downwards and has a lower funnel opening, whereby the housing is arranged in such a way that it protrudes through the passage opening of the stop plate. The suction tool preferably protrudes downwards at least in certain areas through the lower funnel opening of the housing. Preferably it is intended that the suction tool is vertically movable together with the housing, thereby protruding through the passage opening. To seize the uppermost cardboard blank, the suction tool and at least a part of the protective housing can be moved to a position below the stop plate by extending the pneumatic cylinder of the pneumatic unit. This means that a movement relative to other components of the removal apparatus takes place, in particular a movement relative to the stop element. After the uppermost cardboard blank has been seized, the suction tool and the housing are pulled upwards by pulling in the pneumatic cylinder, leading to an upward movement of the cardboard blank. After aligning the cardboard blank with the stop element, the lower funnel opening of the housing is arranged at least in one plane with the stop surface of the stop element or above the stop surface of the stop element.

The pendular movement of the suction tool or the pendular movement of the pneumatic unit and the suction tool is limited and thus partially restricted by the protective housing.

Preferably, it can be provided, that a further protective element is provided on the upper side of the stop element, which further protective element confines the passage opening and which further protective element broadens upwards starting from the passage opening. Hereby, it is preferably intended, that the inclination of the outside of the funnel or the outside of the funnel shaped housing corresponds approximately to the inclination of the inside of the protective element. Preferably, the suction tool is lowered together with the housing by extending the pneumatic cylinder within the removal apparatus so that a part of the outer surface area of the housing is brought substantially into contact with the inner surface area of the protective element, thereby limiting the mobility of the housing and thus the mobility of the suction tool. In particular, in this so-called withdrawal position no pendular movement of the suction tool is possible and it is ensured that the suction tool is in a defined central position within the removal apparatus. The entire removal apparatus is then lowered further until the suction tool sucks in the uppermost cardboard blank from the stack located within the magazine.

The suction tool is then pulled up together with the housing by pulling in the pneumatic cylinder, whereby the contact between a part of the outer surface area of the housing and the inner surface area of the protective element is removed. This allows for the pendular movement of the suction tool and the housing to be carried out as described above, which pendular movement serves to align the seized cardboard blank within the magazine and/or which supports the alignment of the seized cardboard blank in a horizontal position within a horizontal plane. Due to the funnel shapes of the housing and the protective ring described above, the more the suction tool is moved further upwards the more it can be deflected.

In the case of the packaging apparatus or removal apparatus described here and by the described method, the respective uppermost cardboard blank is lifted and withdrawn within the shaft limited by the side walls of the magazine and simultaneously aligned in a horizontal orientation. The separation from the underlying cardboard blanks is preferably carried out using an additional pneumatic unit and a suction tool. In accordance with one embodiment of the invention, it is intended that the suction tool precedes the other fixing devices, in particular a plurality of other fixing devices arranged on the stop element. The uppermost cardboard blank of a stack of cardboard blanks arranged within the magazine is sucked in and withdrawn by the suction tool.

The suction tool is moved vertically upwards by the pneumatic unit, whereby the seized cardboard blank is moved upwards along the shaft walls of the magazine in the direction of at least one further fixing device. Also, with this embodiment, the entire withdrawal process or the safe seizure of the uppermost cardboard blank takes place within the shaft walls of the magazine, which thus determine the position and/or orientation of the cardboard blank. In a first step of the withdrawal process, the cardboard blank is sucked in by a suction tool designed as a vacuum suction cup and attached to the lower end of the piston rod of a pneumatic cylinder.

The cardboard blank is seized approximately in the middle. The pneumatic cylinder is preferably suspended in a pendular manner at the upper end, so that the cardboard blank can perform a lateral movement within the limits of the shaft walls of the magazine. In a second step, the pneumatic cylinder mentioned above is retracted, thereby pulling the suction tool together with the cardboard blank against the stop plate. In combination with the shaft walls of the magazine, which assume the function of guide elements, the cardboard blank is aligned and oriented in the correct position. At the end of the upward movement, in particular when the cardboard blank is in contact with the stop plate, the cardboard blank can be additionally seized by at least one further fixing device, in particular by further vacuum suction cups. This additional fixing may be necessary and/or useful for further processing.

With the aid of the aforementioned packaging apparatus, the corresponding removal apparatus and the described method, cardboard blanks which are stacked on top of each other can be safely removed from a corresponding magazine regardless of their orientation, especially regardless of an inclined position relative to a horizontal plane and regardless of the type of cardboard blanks. In particular, the horizontal alignment of the cardboard blanks ensures that the cardboard blanks are delivered to a subsequent handling device in a precise orientation.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

The same or equivalent elements of the invention are designated by identical reference characters. Furthermore, and for the sake of clarity, only the reference characters relevant for describing the respective figure are provided. It should be understood, that the embodiments described are only examples describing an embodiment of the apparatus and/or method according to the invention. They are not intended to limit the scope of the disclosure.

DETAILED DESCRIPTION OF THE INVENTION

Figure 1:
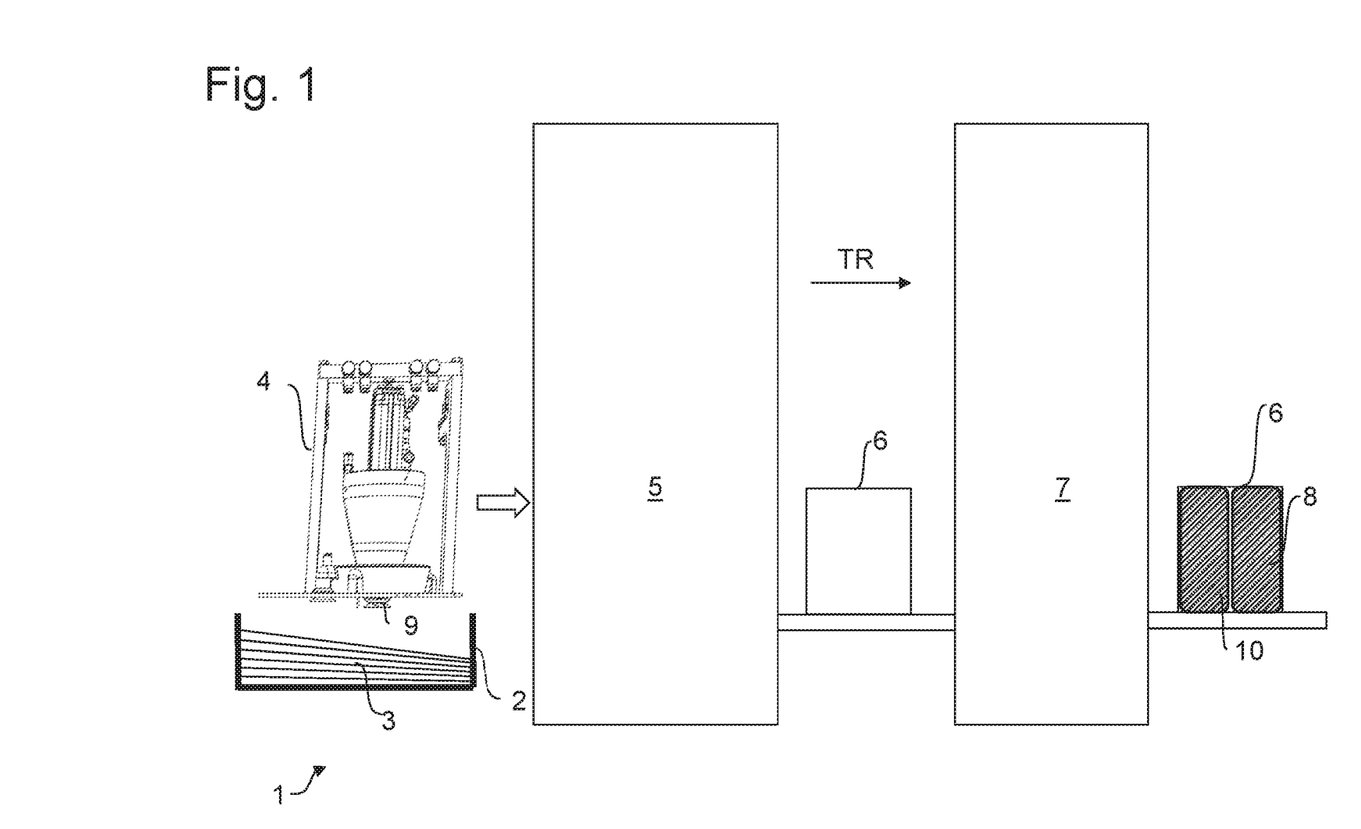
FIG. 1 shows an embodiment of a packaging apparatus for the production of an outer package according to the invention comprising a removal apparatus for a cardboard blank.

The schematic illustration of FIG. 1 shows a packaging apparatus 1 for producing an outer package 6 comprising a removal apparatus 4 for withdrawal of a cardboard blank 3. The cardboard blanks 3 are stacked lying horizontally one above the other in a magazine 2. Within the magazine 2, an undesired inclined position of the cardboard blanks 3 can occur. This inclination can accumulate further and further over the height and thus become more pronounced with an increasing number of cardboard blanks 3 stacked one above the other.

The removal apparatus 4 comprises at least one suction tool 9, with which suction tool 9 the uppermost cardboard blank 3 can be picked up inside the magazine 2 and removed or withdrawn from the magazine 2. The cardboard blank 3 seized by the removal apparatus 4 is transported to a subsequent handling device and is further processed in this handling device. For this purpose, the removal apparatus 4 is designed to be vertically movable and horizontally movable in order to remove the seized cardboard blank 3 from the magazine with an upwards directed movement and to transport the seized cardboard blank 3 to the following handling device with an at least partially lateral directed movement.

FIG. 1 shows an example of a subsequent handling device in the form of a pull-up device or unfolding device 5, by which handling device the cardboard blank 3 is pulled up or unfolded into its form as an outer package 6. Within an inserting apparatus 7 the outer package 6 can now be filled with articles 8 and, if necessary, the outer package 6 is sealed, thus producing a finished product 10, for example a package ready for sale.

For example, the cardboard blank 3 can be prepared to form an outer package 6 in the form of a so-called basket. In this case the unfolding of the cardboard blank 3, in particular, creates an outer package which comprises directly integrated partitions. The term "partition" is used to describe dividing elements which prevent direct contact between the articles 8 arranged within the outer package 6. In the beverage industry, for example, the use of so-called six-pack baskets is well known. The six-pack baskets usually have two rows each comprising three separate storage spaces for articles, thus providing a total of six storage spaces. The six storage spaces are laterally separated from one another. Furthermore, the six-pack baskets usually also include a centrally arranged handle area. The six-pack baskets can, for example, be filled with six bottles or other beverage containers, wherein identical or different articles can be used. For example, in an advantageous embodiment it can be provided that different beverage products of one manufacturer are combined in a six-pack basket.

Figure 2:
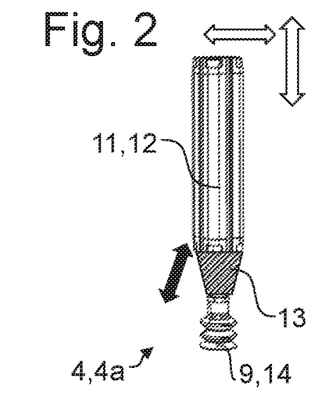
FIG. 2 shows a first embodiment of a removal apparatus.

FIG. 2 shows a first embodiment of a removal apparatus 4, 4a. As already described in connection with FIG. 1, the removal apparatus 4, 4a is vertically movable and horizontally movable. These movement possibilities are indicated by the white arrows with black border shown in FIG. 2. For this purpose, for example, the removal apparatus 4, 4a, is arranged on a horizontally shiftable lifting column or similar. For example, a lifting device 11 can be assigned to suction tool 9 to enable vertical movement of the suction tool 9. As lifting device 11 a pneumatic unit or pneumatic cylinder 12 can be used, for example.

It is preferentially provided that the suction tool 9 is arranged pivotally movable on the removal apparatus 4, 4a, in particular via a pivot region 13 arranged pivotally movable on the pneumatic cylinder 12. The suction tool 9 can thus carry out a pivoting movement in at least one further axis in addition to the vertical movement and the horizontal movement. This is indicated schematically by the black arrow.

In order to create a further movement component, the pneumatic cylinder 12 may be suspended in a pendular manner or the suction tool may be suspended from the pneumatic cylinder 12 in a pendular manner.

The suction tool 9, for example, is designed as a suction cup. In particular, the suction tool 9 is designed as vacuum suction cup 14. By applying a negative pressure or vacuum, an uppermost cardboard blank 3 is sucked in and can be removed by an upwards directed movement and furthermore preferably by a laterally directed movement (see also FIG. 1). In order to release the seized cardboard blank for further processing, a corresponding pressure is built up inside the vacuum suction cup 14, which pressure build up leads to the cardboard blank being released again. The advantage of the significantly increased mobility of the suction tool 9 of a packaging apparatus according to the invention in comparison to apparatuses known from the prior art, which are, for example, equipped with a plurality of suction cups spring-mounted in the vertical direction, is emphasized in connection with the following description of the withdrawal process according to the invention.

The entire withdrawal process preferably takes place within the magazine 2, especially within the side walls of the magazine 2. The side walls of the magazine 2 laterally limit and laterally define the position and/or orientation and/or alignment of the respective cardboard blank 3 within the magazine 2. In a first step, the removal apparatus 4 is positioned above the magazine 2. The removal apparatus 4 or parts of the removal apparatus 4 are moved downwards until the suction tool 9 rests on the uppermost cardboard blank 3. In particular, the suction tool 9 is moved downwards by the pneumatic cylinder 12 until it rests on the uppermost cardboard blank 3. The removal apparatus 4 is preferably positioned approximately centrally above the magazine 2, so that the cardboard blank 3 is subsequently seized by the suction tool 9, in particular by the vacuum suction cup 14, in an approximately central position inside the magazine 2.

Then the suction tool 9 is pulled upwards by the pneumatic cylinder 12. Thereby, the cardboard blank 3 is horizontally aligned within the lateral boundaries of the side walls of the magazine 2. This horizontal alignment is made possible and supported by the pivoting movement of the suction tool 9, whereby a compensation movement takes place which leads to the horizontal alignment of the cardboard blank 3.

In accordance with a preferred embodiment, it is intended that the suction tool 9 directly takes up a central position when seizing the uppermost cardboard blank 3. In particular, no pendular movement of the suction tool 9 is possible at this time, for example, the pendular movement is blocked to enable precise central positioning of the suction tool 9 on the cardboard blank 3. As soon as the suction tool 9 seizes the uppermost cardboard blank 3 and begins to detach it from the underlying cardboard blanks of the stack by an upwards directed movement, the blockade or the like is released. The suction tool 9 can now perform a lateral oscillating or pendular movement and thereby the cardboard blank can align itself horizontally within the lateral boundaries of the magazine.

Figure 3A:
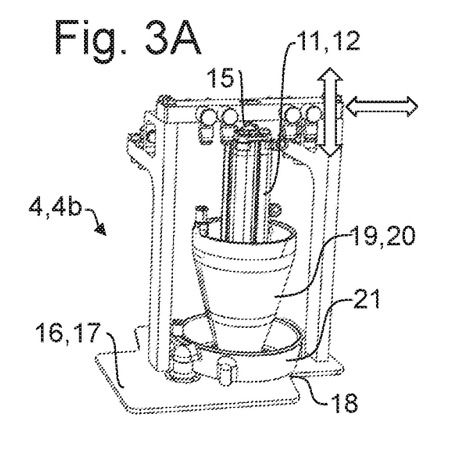
FIGS. 3A to 3E show different views of a first embodiment of a removal apparatus.
Figure 3B:
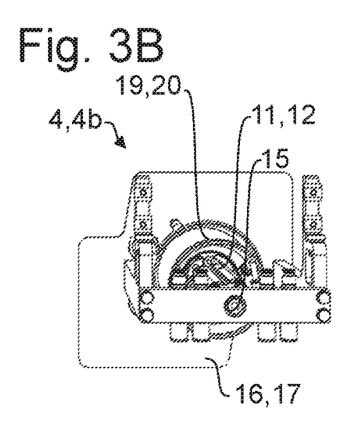
Figure 3C:
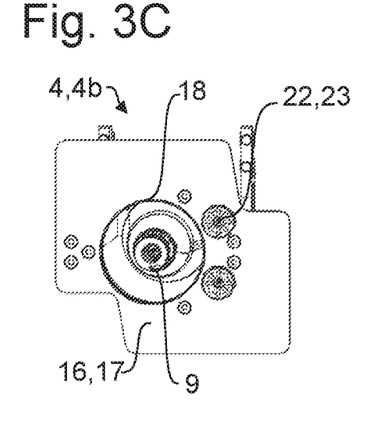
Figure 3D:
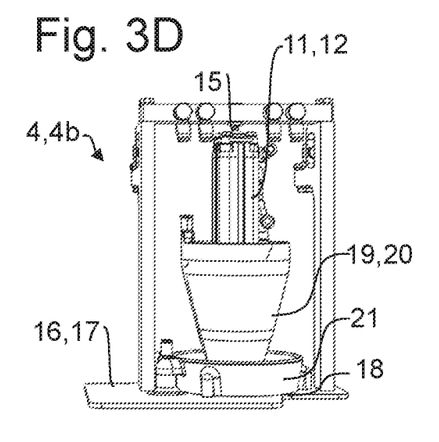
Figure 3E:
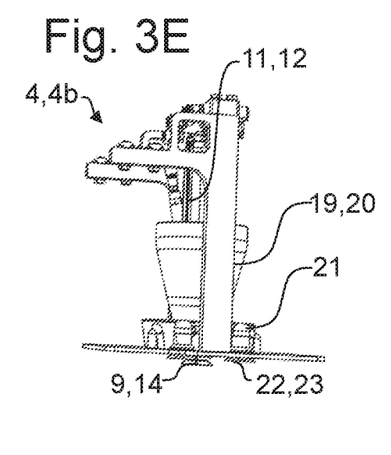

FIGS. 3A to 3E show different views of a second embodiment of a removal apparatus 4, 4b, in particular FIG. 3A shows a perspective view, FIG. 3B shows a top view, FIG. 3C shows a bottom view, FIG. 3D shows a side view and FIG. 3E shows a further perspective view. FIGS. 4A to 4D illustrate the withdrawal process using a removal apparatus 4, 4b as shown in FIG. 3.

The vertical mobility and the horizontal mobility of the removal apparatus 4, 4b according to the shown embodiment is also indicated by white arrows with black borders. The removal apparatus 4, 4b comprises a pneumatic cylinder 12 which is suspended in a pendular manner. At the lower end of the pneumatic cylinder 12 a first suction tool 9 is arranged, which has the form of a vacuum suction cup 14. In particular, the pneumatic cylinder 12 is suspended in a pendular manner around a vertical axis (seen from the center of the earth) from a bearing 15. Furthermore, it is provided, that the suction tool 9 is additionally arranged on the pneumatic cylinder 12 in such a way that it can be pivoted (not visible).

In the second embodiment presented here, a stop element 16 is also provided which stop element 16, in particular, provides a stop surface for the cardboard blank 3. For example, the stop element 16 is designed in the form of a stop plate 17, which stop plate 17 is arranged in a horizontal plane H. The stop element 16 or stop plate 17 has an approximately central passage opening 18, which preferably has a circular form.

The pneumatic cylinder 12 with the suction tool 9 is arranged within the removal apparatus 4, 4b in such a way that it can at least partially pass through the passage opening 18 of the stop element 16. In particular, a working position can be provided, in which the pneumatic cylinder 12 is extended in such a way that the suction tool 9 is located at a distance below the stop element 16. Due to the pendular suspension of the pneumatic cylinder 12, the pneumatic cylinder 12 together with the attached suction tool 9 can move laterally within an area limited by the passage opening 18. To protect the pneumatic cylinder 12 and the suction tool 9 during this pendular movement, a housing 19 can be provided as a protective device. The housing 19 is at least partially located around the pneumatic cylinder 12 and the suction tool 9, especially the housing 19 is located within the area of the passage opening 18. The housing 19 is designed, for example, in the form of a protective funnel 20 that is tapering downwards in the direction of the suction tool 9. Furthermore, a protective ring 21 can be provided around the passage opening 18 on the upper side of the stop plate 17, which protective ring 21 laterally limits and laterally guides the movement of the protective funnel 20.

Further second suction tools 22, in particular suction cups 23, can be assigned to the underside of the stop element 16 or the stop plate 17. These further second suction tools 22 can additionally support the seizing of a cardboard blank 3 (see FIG. 1). The suction cups 23 can also work with vacuum support.

FIGS. 4A to 4D show the withdrawal process by a removal apparatus 4, 4b as shown in FIG. 3. The withdrawal process takes place within the side walls 24 of the magazine 2, which are hereinafter also referred to as shaft walls 25. According to one embodiment, the magazine 2 has a base area limited by the side walls 24, which base area essentially corresponds to the size of the folded cardboard blank 3. Therefore, the position of the cardboard blanks 3 within the magazine is preset and mandatory.

First the removal apparatus 4, 4b is positioned above the magazine 2 in such a way that it is centered above the magazine 2. The removal apparatus 4, 4b is then lowered so that the stop element 16 is arranged within the side walls 24 of the magazine 2. Now the first suction tool 9 together with the housing 19 is lowered via the pneumatic cylinder 12 through the protective ring 21 and through the passage opening 18 until the suction tool 9 sucks in the uppermost cardboard blank 3 (see arrow in FIG. 4B).

Figure 4A:
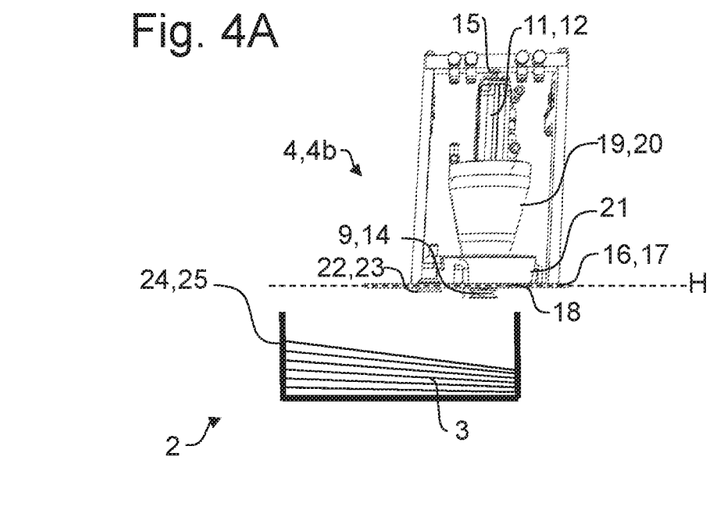
FIGS. 4A to 4D illustrate the withdrawal process using a removal apparatus as shown in FIG. 3.
Figure 4B:
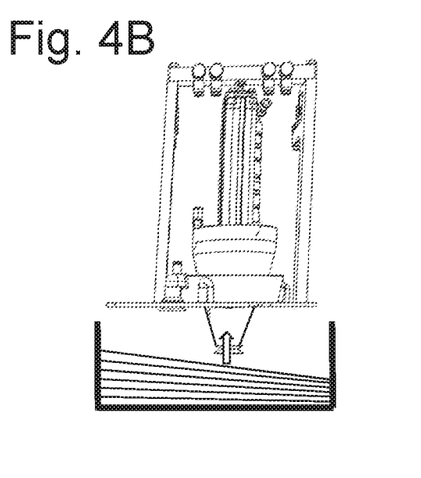

The cardboard blank 3 is seized approximately in the middle. Since the pneumatic cylinder 12 is suspended in a pendular manner at its upper end, the seized cardboard blank 3 can perform a lateral movement or a pendular movement, whereby this lateral movement is limited by the side walls 24 of the magazine 2.

Figure 4C:
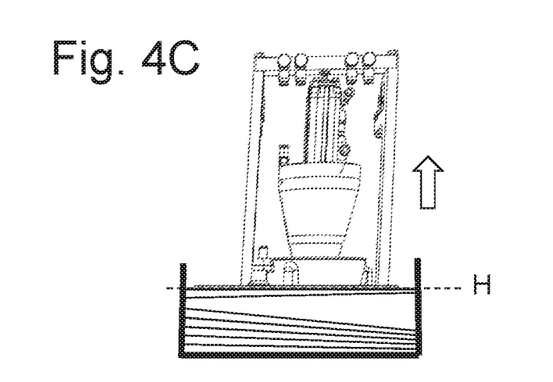
Figure 4D:
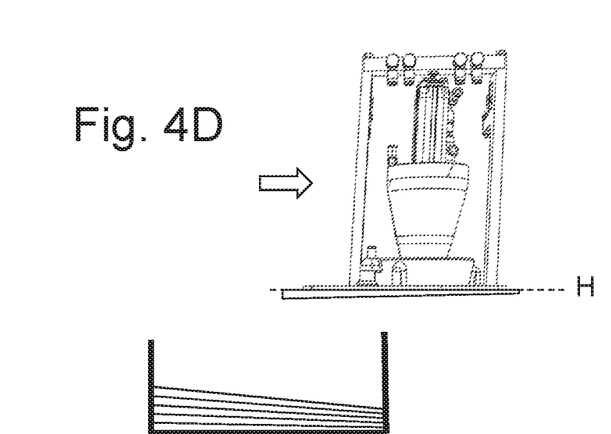

By pulling in or shortening the pneumatic cylinder 12, the suction tool 9 with the cardboard blank 3 and the housing 19 are pulled upwards. In particular, the cardboard blank 3 is pulled against the stop element 16 and comes to rest on the lower side of the stop element 16. This is made possible and/or supported in particular by the pivotal mobility of the suction tool 9 described above. Thus, the cardboard blank 3 is aligned in the correct position by the stop element 16 in conjunction with the side walls 24 or shaft walls 25 of magazine 2 (FIG. 4C). Additional second suction tools 22 can be provided on the lower side of the stop plate 17 of the removal apparatus 4, 4b in order to seize and hold the cardboard blank 3 even more securely. These second suction tools 22 can be formed, in particular, by suction cups 23, which suction cups 23 can be supplied with vacuum. Now the entire removal apparatus 4, 4b can be moved upwards until both the stop element 16 and the seized cardboard blank 3 are located above the side walls 24 of the magazine 2 and can be transferred by a further movement in the lateral direction (FIG. 4D) to a subsequent handling device for further processing. Irrespective of the direction, the angular deviation, the inclined position and the design of the cardboard blanks 3, the cardboard blanks 3 can now be removed safely and, in particular, in the correct orientation by a removal apparatus 4 described above. This ensures precise positioning of the cardboard blanks 3 in subsequent handling devices where further processing takes place.

Preferably, it can be provided, that the protective ring 21 also tapers downwards in a funnel shape. Particularly, the inclination of the outside of the funnel of the housing 19 or the inclination of the outside of the funnel of the protective funnel 20 corresponds approximately to the inclination of the inside of the funnel of the protective ring. According to one embodiment, the suction tool 9 together with the housing 19 is lowered within the removal apparatus to the extent that at least a part of the area of the outer surface of the housing 19 is essentially brought into contact with the inner surface of the protective ring 21, thereby limiting the mobility of the housing 19 and thus limiting the mobility of the suction tool 9. In particular, no oscillating or pendular movement is possible in this so-called withdrawal position (see FIG. 4B) and it is ensured that the suction tool 9 is in a defined central position within the removal apparatus 4, 4b. The entire removal apparatus 4, 4b is then lowered further until the suction tool 9 sucks in and seizes the uppermost cardboard blank 3.

Now the suction tool 9 together with the housing 19 is pulled up by the pneumatic cylinder 12, whereby the contact between a part of the outer surface of the housing 19 and the inner surface of the protective ring 21 is cancelled. This means that the oscillating or pendular movement described above can now be carried out by the suction tool 9, which serves to align the seized cardboard blank 3 in a horizontal position within a horizontal plane H and/or which supports the alignment of the seized cardboard blank 3 in a horizontal position within a horizontal plane H. Due to the described funnel shapes of the housing 19 and the protective ring 21, the more the suction tool 9 is moved upwards the more it can be deflected laterally.

Figure 5A:
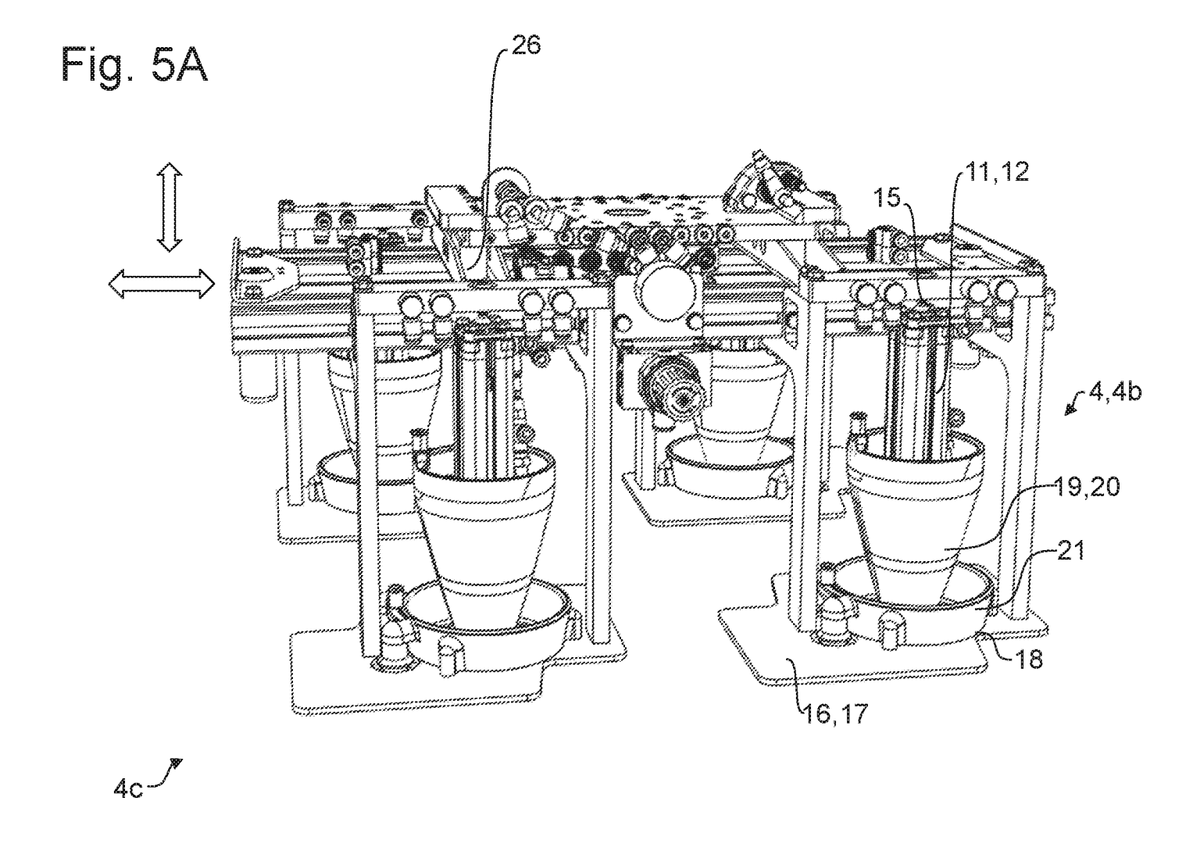
FIGS. 5A to 5E show different views of a withdrawal module.
Figure 5B:
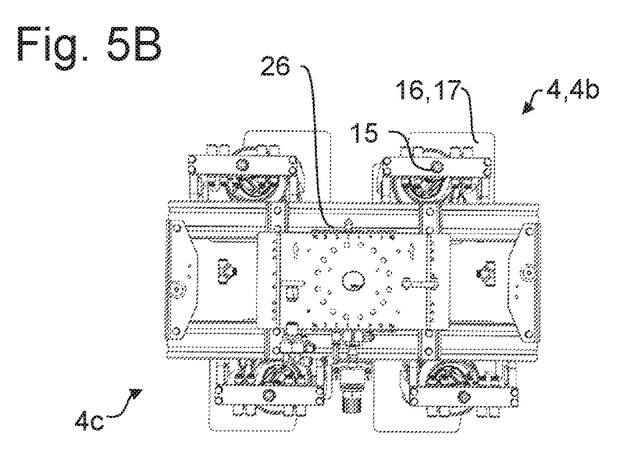
Figure 5C:
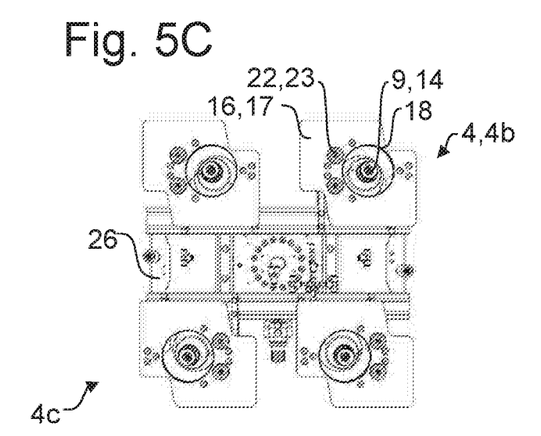
Figure 5D:
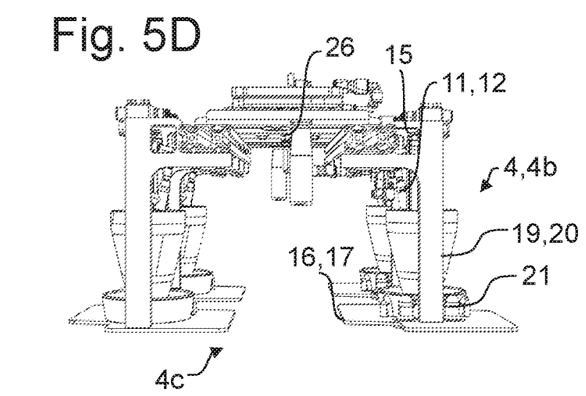
Figure 5E:
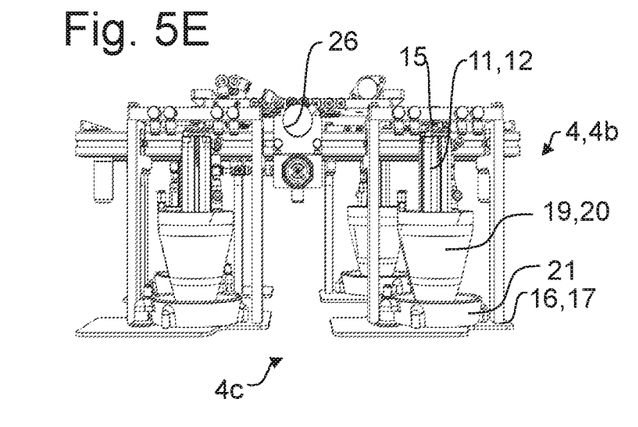

FIGS. 5A to 5E show different views of a withdrawal module 4c, in particular FIG. 5A shows a perspective view, FIG. 5B shows a top view and FIG. 5C shows a bottom view, FIGS. 5D and 5E each show different side views.

In this case four removal apparatuses 4b are arranged on a horizontally movable and vertically movable frame 26 of the withdrawal module 4c, so that four cardboard blanks can be withdrawn at the same time from four correspondingly arranged magazines and fed for further processing. Hereby, it can particularly be provided, that the four cardboard blanks seized simultaneously are also deposited simultaneously at correspondingly arranged working areas of at least one subsequent processing or handling module. Alternatively, it may be provided, that the four removal apparatuses 4b arranged on the common frame 26 can each be individually controlled for depositing the cardboard blanks, so that the cardboard blanks can, for example, be deposited one after the other. Thereby, a further processing module can possibly be approached by a further movement of the withdrawal module 4c with a horizontal movement component and/or with a vertical movement component.

The embodiments, examples and variants described in the preceding paragraphs, in the claims or in the general description and the figures, including their different views or respective individual features, may be used independently of each other or in any combination. Features that are described in conjunction with an embodiment are applicable to all embodiments unless the features are incompatible.

Although in the context of the figures there is generally talk of "schematic" representations and views, this in no way means that the figure representations and their description should be of secondary importance with regard to the disclosure of the invention. The skilled person is perfectly capable of extracting enough information from the schematically and abstractly drawn representations to facilitate his understanding of the invention without being affected in any way in his understanding, for example by the scale proportions of the cardboard blanks and/or parts of the apparatus or other drawn elements which are possibly not exactly to scale. The figures thus enable the skilled person reading the description to derive a better understanding of the idea according to the invention that is abstractly formulated in the claims and in the general part of the description. The figures especially represent possible implementations or specific embodiments of the method according to the invention and the more concretely explained functioning of the apparatus according to the invention.

The invention was described with reference to a preferred embodiment. However, it is conceivable for a person skilled in the art that modifications or alterations of the invention can be made without leaving the scope of protection of the following claims.

REFERENCE CHARACTER LIST 1 packaging apparatus
2 magazine
3 cardboard blank
4,4a,4b removal apparatus
4c withdrawal module
5 pull-up device or unfolding device
6 outer package
7 inserting apparatus
8 article
9 (first) suction tool
10 product
11 lifting device
12 pneumatic unit/pneumatic cylinder
13 pivot region
14 vacuum suction cup
15 bearing
16 stop element
17 stop plate
18 passage opening
19 housing
20 protective funnel
21 protective ring
22 (second) suction tools
23 suction cups
24 side wall
25 shaft wall
26 frame
H horizontal plane

The invention claimed is:

1. A removal apparatus (4) for cardboard blanks (3), which cardboard blanks (3) are stacked on top of one another within the magazine (2) comprising:
   at least one suction tool (9) for seizing and withdrawing a cardboard blank (3) from a magazine (2) where the cardboard blanks (3) are stacked on top of one another within the magazine (2), at least one stop element (16) for each of the at least one suction tool (9), wherein the at least one stop element (16) comprises a horizontally aligned stop plate (17), wherein the stop plate (17) comprises a substantially centrally constructed passage opening (18), wherein the at least one suction tool (9) is vertically movable through the passage opening (18) and laterally movable with the passage opening (18); and wherein the at least one suction tool (9) is pivotally movable to align the withdrawn cardboard blank (3) in a horizontal plane.

2. The removal apparatus (4) of claim 1, wherein an orientation of the suction tool (9) is automatically adjustable to match an orientation of an upper side of an uppermost cardboard blank (3) and with respect to the horizontal plane when the uppermost cardboard blank (3) has been withdrawn.

3. The removal apparatus (4) of claim 2, wherein a pneumatic unit (12) is connected to the at least one suction tool (9).

4. The removal apparatus (4) of claim 3, wherein the at least one suction tool (9) is pivotably attached to the pneumatic unit (12) or wherein the pneumatic unit (12) is pivotably suspended.

5. The removal apparatus (4) of claim 1, wherein the stop element (16) comprises at least one horizontal stop surface.

6. The removal apparatus (4) claim 1, further comprising at least one further fixing device (22).

7. The removal apparatus (4) of claim 6, wherein the at least one suction tool (9) and the at least one further fixing device (22) each comprise a vacuum suction cup (14, 23).

8. The removal apparatus (4) of claim 1, wherein the at least one suction tool (9) and a pneumatic unit (12) are surrounded, at least in parts, by a funnel-shaped housing (19) which housing (19) tapers downwards and has a lower funnel opening, the housing (19) being arranged so as to penetrate the passage opening (18) of the stop plate (17), the at least one suction tool (9) is vertically movable together with the housing (19), and the at least one suction tool (9) protrudes downwards through the lower funnel opening.

9. The removal apparatus (4) of claim 8, wherein the housing (19) limits pivotable movement of the at least one suction tool (9).

10. A packaging apparatus (1) for combining a plurality of articles (8) in an outer packaging (6) formed from a cardboard blank (3), the packaging apparatus (1) comprising:

a magazine (2) for cardboard blanks (3), the cardboard blanks (3) being stacked and lying on top of one another within the magazine (2);

a removal apparatus (4) for the withdrawal of cardboard blanks (3) from the magazine (2); and a handling device (5) for further processing the cardboard blanks (3);

wherein the removal apparatus (4) is vertically movable and is horizontally movable, and the removal apparatus (4) comprising at least one suction tool (9) for seizing and withdrawing a cardboard blank (3) from the magazine (2);

wherein the removal apparatus comprises at least one stop element (16) for each of the at least one suction tool (9), wherein the at least one stop element (16) comprises a horizontally aligned stop plate (17), wherein the stop plate (17) comprises a substantially centrally constructed passage opening (18), wherein the at least one suction tool (9) is vertically movable through the passage opening (18), laterally movable within the passage opening (18), and pivotally movable for executing a compensation movement and aligning the withdrawn cardboard blank (3) in a horizontal plane.

11. The packaging apparatus (1) of claim 10 wherein an orientation of the suction tool (9) is automatically adjustable to match an orientation of an upper side of an uppermost cardboard blank (3) in the magazine (2).

12. The packaging apparatus (1) of claim 11 wherein the orientation of the suction tool (9) is automatically adjustable to match the orientation of the upper side of an uppermost cardboard blank (3) to the horizontal plane after the uppermost cardboard blank (3) has been withdrawn.

13. A method for withdrawing cardboard blanks (3) from a magazine (2) comprising:

attaching at least one suction tool (9) to an upper side of an uppermost cardboard blank (3) stacked in a magazine, wherein the upper side of the uppermost cardboard blank (3) has an inclined position within the magazine, wherein for each of the at least one suction tool (9) there is at least one stop element (16) comprising a horizontally aligned stop plate (17) with a substantially centrally constructed passage opening (18), wherein the cardboard blank (3) is pulled against the at least one stop element (16) and wherein the at least one suction tool (9) is vertically movable through the passage opening (18) laterally movable within the passage opening (18), and pivotally movable;

withdrawing the cardboard blank from the magazine; and aligning the cardboard blank in a horizontal plane within the magazine during the withdrawing step.

14. The method of claim 13 further comprising automatically adjusting an orientation of the suction tool (9) to match an orientation of the upper side of the uppermost cardboard blank (3).

15. The method of claim 14 further comprising transferring the withdrawn cardboard blank (3) to a handling device for further processing.

* * * * *

UNITED STATES PATENT AND TRADEMARK OFFICE
CERTIFICATE OF CORRECTION

PATENT NO. : 11,345,499 B2  
APPLICATION NO. : 16/705502  
DATED : May 31, 2022  
INVENTOR(S) : Christian Canalicchio, Rudolf Schrems and Wolfgang Fechter

Page 1 of 1

It is certified that error appears in the above-identified patent and that said Letters Patent is hereby corrected as shown below:

On the Title Page

Item (30) Foreign Application Priority Data, insert --Dec. 14, 2018 (DE) .............. 10 2018 132 330.1--

Signed and Sealed this  
Thirteenth Day of September, 2022

Katherine Kelly Vidal  
*Director of the United States Patent and Trademark Office*